(12) United States Patent
Mack (10) Patent No.: US 12,263,706 B2
(45) Date of Patent: Apr. 1, 2025

(54) TRAILER LANDING GEAR DRIVE SHAFT ROTATING DEVICE AND METHOD OF USE

(71) Applicant: Troy Edward Mack, Bloomington, MN (US)

(72) Inventor: Troy Edward Mack, Bloomington, MN (US)

(*) Notice: Subject to any disclaimer, the term of this patent is extended or adjusted under 35 U.S.C. 154(b) by 347 days.

(21) Appl. No.: 18/082,633

(22) Filed: Dec. 16, 2022

(65) Prior Publication Data

US 2024/0198745 A1 Jun. 20, 2024

(51) Int. Cl.
*B60D 1/66* (2006.01)

(52) U.S. Cl.
CPC ........................ *B60D 1/66* (2013.01)

(58) Field of Classification Search
CPC ................................. B60D 1/66; B60S 9/08
See application file for complete search history.

(56) References Cited

U.S. PATENT DOCUMENTS

| | | |
|---|---|---|
| 5,911,437 A | 6/1999 | Lawrence |
| 6,010,154 A | 1/2000 | Payne |
| 6,598,886 B2 | 7/2003 | Baird |
| 6,926,305 B2 | 8/2005 | Daniel |
| 8,590,417 B1 * | 11/2013 | Bono ............... B60S 9/08 254/419 |
| 9,242,622 B1 * | 1/2016 | Sanders ............ B60S 9/08 |
| 10,464,193 B2 | 11/2019 | Chen |
| 2022/0169211 A1 | 6/2022 | Bedel |

* cited by examiner

*Primary Examiner* — Jason L Vaughan
*Assistant Examiner* — Amanda Kreiling (57) ABSTRACT

A trailer landing gear drive shaft rotating device for operating legs of a trailer landing gear assembly includes first and second couplers, which are attached to first and second ends of a rod, respectively. The first coupler is selectively couplable to a drive shaft of a trailer landing gear assembly so that the rod is reversibly pivotal between stowed and interim configurations, wherein the rod hangs from the drive and is substantially colinear with, and slidable relative to, the drive shaft, respectively. A terminal segment of the drive shaft is slidable into a first recess, which extends into the first end, as the rod is slid from the interim configuration to an operable configuration. The second coupler can engage a rotary tool, which then is positioned to impart a rotary force to the drive shaft to selectively raise and lower one or more legs of the trailer landing gear assembly.

17 Claims, 9 Drawing Sheets

TRAILER LANDING GEAR DRIVE SHAFT ROTATING DEVICE AND METHOD OF USE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to shaft rotating devices and more particularly pertains to a new shaft rotating device for operating legs of a trailer landing gear assembly. The present invention discloses a shaft rotating device that is pivotally attachable to a drive shaft of the trailer landing gear assembly, thereby allowing it to be pivoted between stowed and operable configurations.

(2) Description of Related Art Including Information Disclosed Under 37 CFR 1.97 and 1.98

The prior art relates to shaft rotating devices, which may comprise gearboxes attachable to drive shafts of trailer landing gear and to rotary tools or hand cranks, or which comprise a motor that is operationally engaged to the gearbox. The gearboxes lower the torque required to rotate the drive shafts. Other shaft rotating devices comprise rods that are removably attachable by their first ends to drive shafts and threadedly attachable to rotatory tools by their second ends. These shaft rotating devices are not configured for permanent pivotal attachment to drive shafts, thus they must be stowed when not in use, and they are not attachable to hand cranks. What is lacking in the prior art is a shaft rotating device comprising a rod, which is pivotally attachable to a drive shaft of the trailer landing gear assembly, thereby allowing it to be pivoted between stowed and operable configurations, and which can be selectively couple to a rotary tool or a crank arm for rotating the drive shaft.

BRIEF SUMMARY OF THE INVENTION

An embodiment of the disclosure meets the needs presented above by generally comprising a first coupler and a second coupler, which are attached to a first end and a second end of a rod, respectively. The first coupler is configured to selectively couple to a drive shaft of a trailer landing gear assembly so that the rod is reversibly pivotal between a stowed configuration and an interim configuration. In the stowed configuration, the rod hangs from the drive shaft, whereas in the interim configuration the rod is substantially colinear with and slidable relative to the drive shaft. A first recess extends into the first end of the rod and is configured for selective insertion of a terminal segment of the drive shaft so that the rod is selectively slidable from the interim configuration to an operable configuration, wherein the terminal segment of the drive shaft has been inserted into the first recess. The second coupler is configured to selectively couple to a rotary tool. The rod is configured to transfer a rotary force from the rotary tool to the drive shaft to selectively raise and lower one or more legs of the trailer landing gear assembly.

Another embodiment of the disclosure includes a landing gear drive shaft rotating system, which comprises a trailer that it fitted with a trailer landing gear assembly that includes a drive shaft and one or more legs. The landing gear drive shaft rotating system also comprises a trailer landing gear drive shaft rotating device, according to the disclosure above, which has been attached to the drive shaft, and a rotary tool, which has been attached to the rod.

Yet another embodiment of the disclosure includes a method of operating legs of a trailer landing gear assembly. Provision steps of the method entail providing a rotary tool, a trailer fitted with a trailer landing gear assembly that comprises a drive shaft and one or more legs, and a trailer landing gear drive shaft rotating device, according to the disclosure above. An installation step is attaching the first end of the rod to the drive shaft using the first coupler. Operational steps of the method are pivoting the rod from the stowed configuration to the interim configuration, sliding the rod from the interim configuration to the operable configuration, attaching the rotary tool to the second end of the rod, and actuating the rotary tool to raise or lower the one or more legs of the trailer landing gear assembly.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 9 thereof, a new shaft rotating device embodying the principles and concepts of an embodiment of the disclosure and generally designated by the reference numeral 10 will be described.

Figure 1:
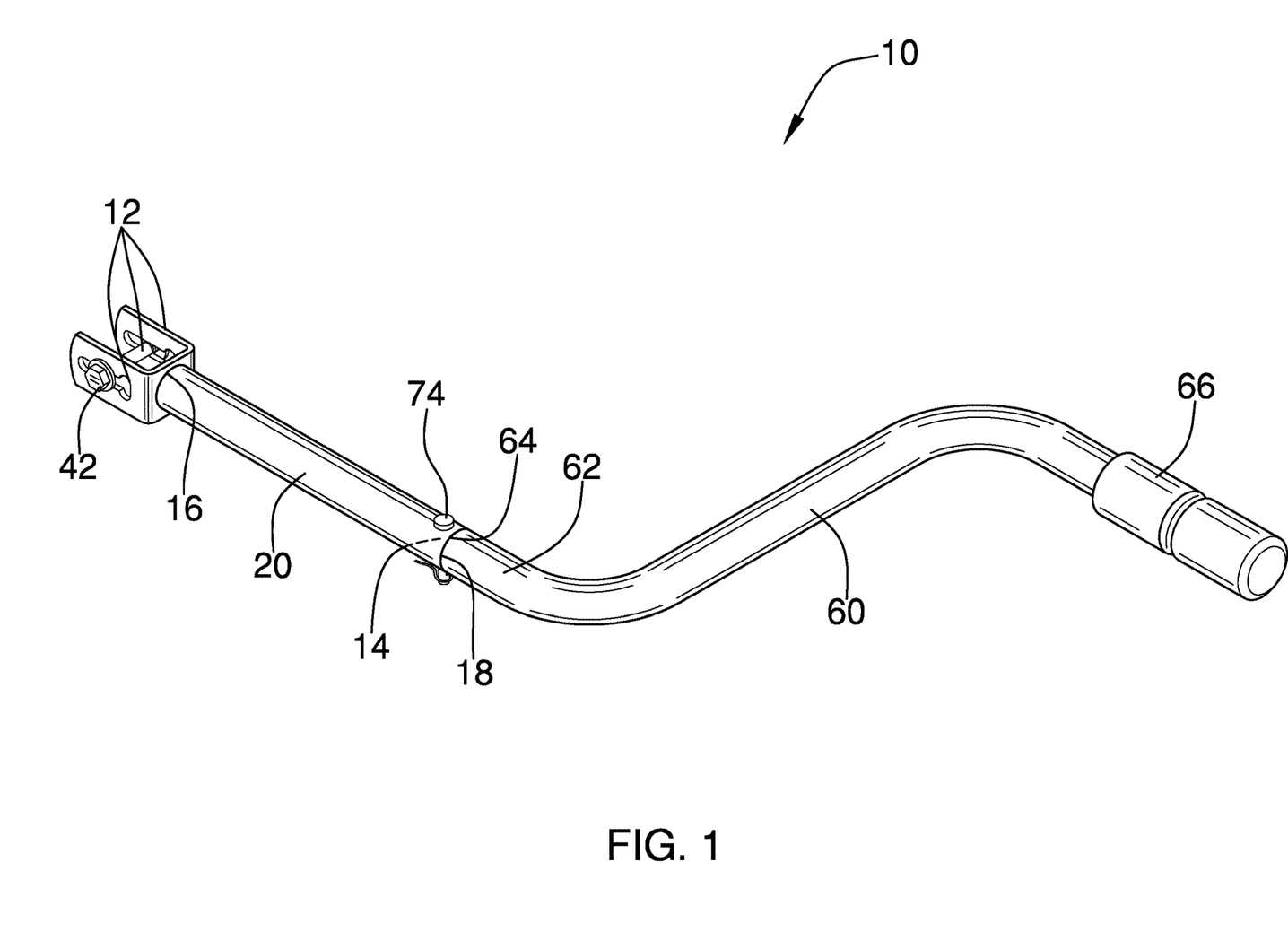
FIG. 1 is an isometric perspective view of a trailer landing gear drive shaft rotating device according to an embodiment of the disclosure.
Figure 2:
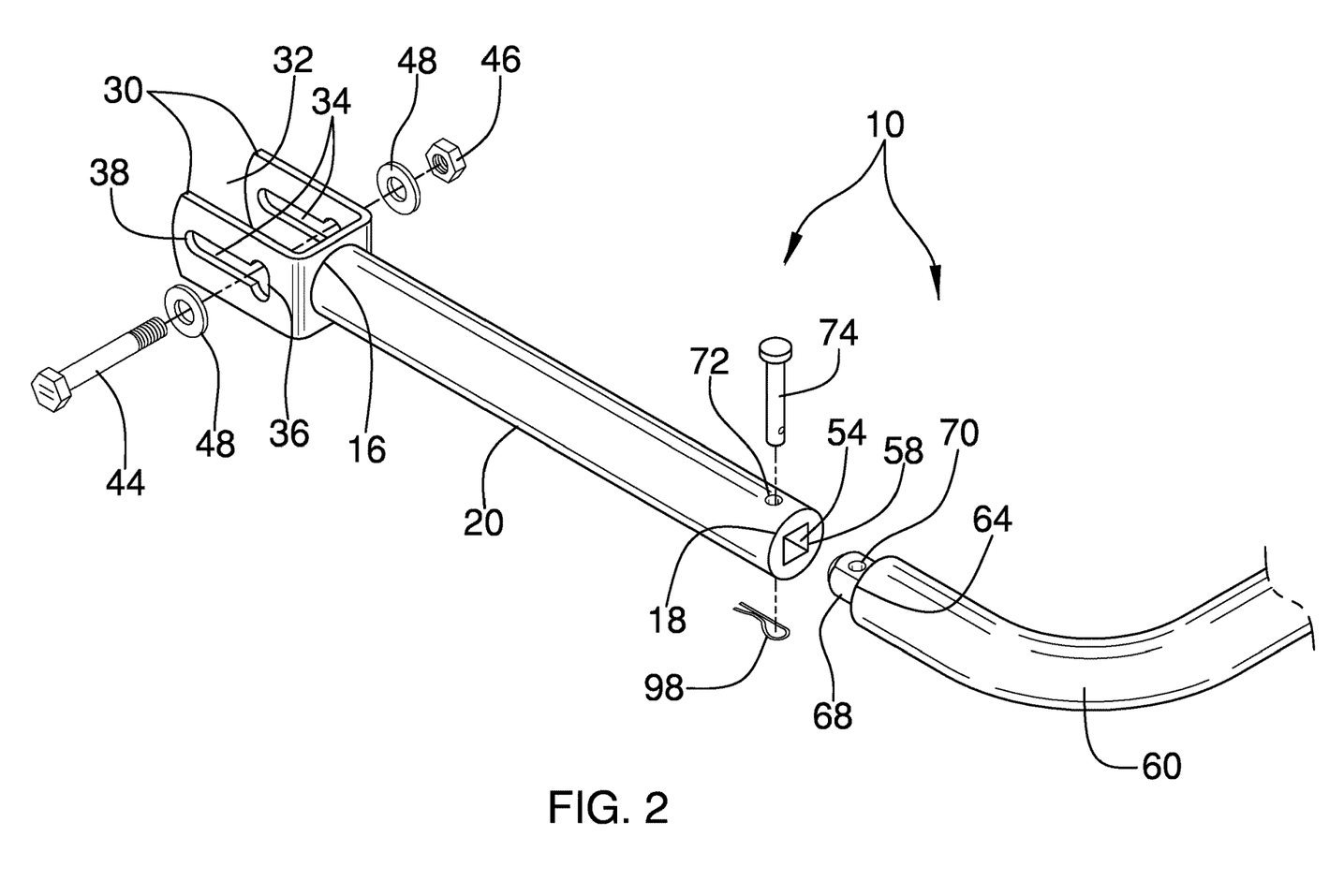
FIG. 2 is an exploded view of an embodiment of the disclosure.
Figure 4:
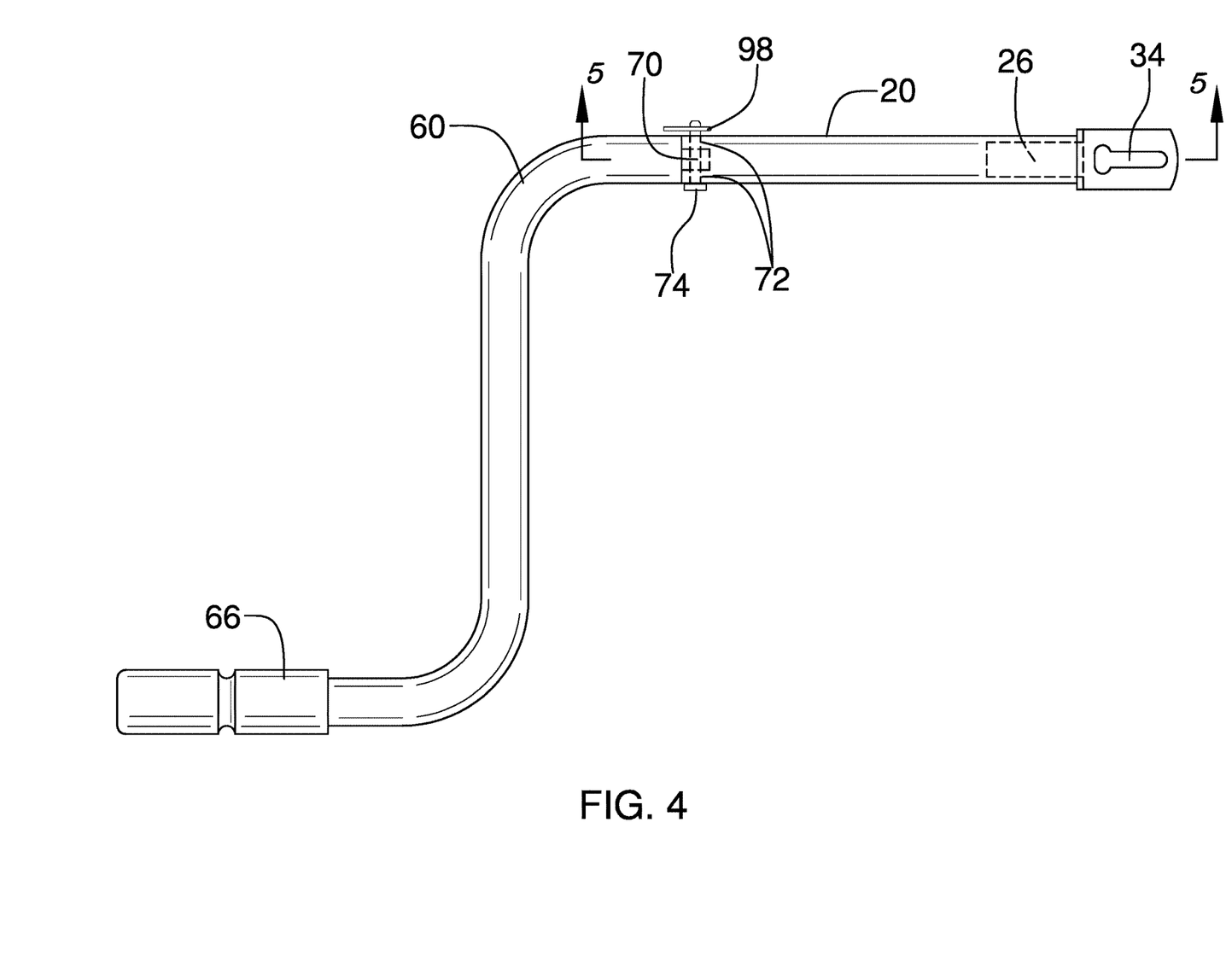
FIG. 4 is a bottom view of an embodiment of the disclosure.
Figure 5:
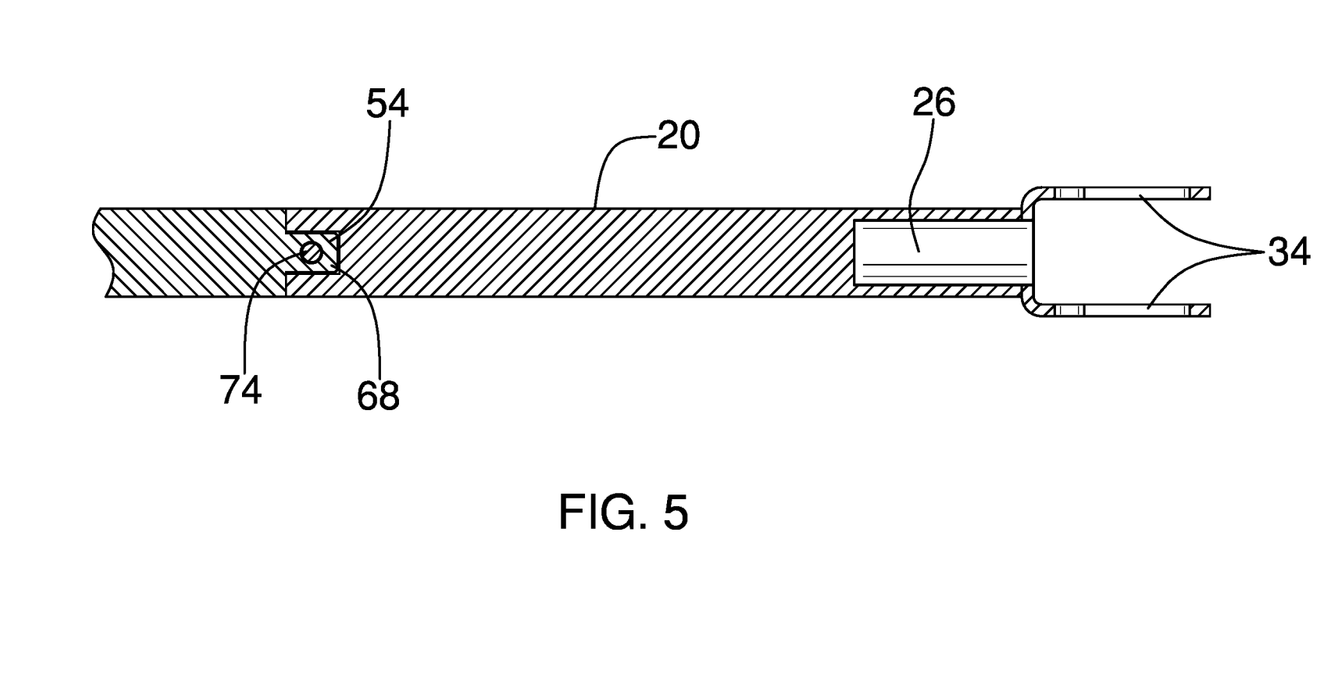
FIG. 5 is a cross-sectional view of an embodiment of the disclosure.
Figure 6:
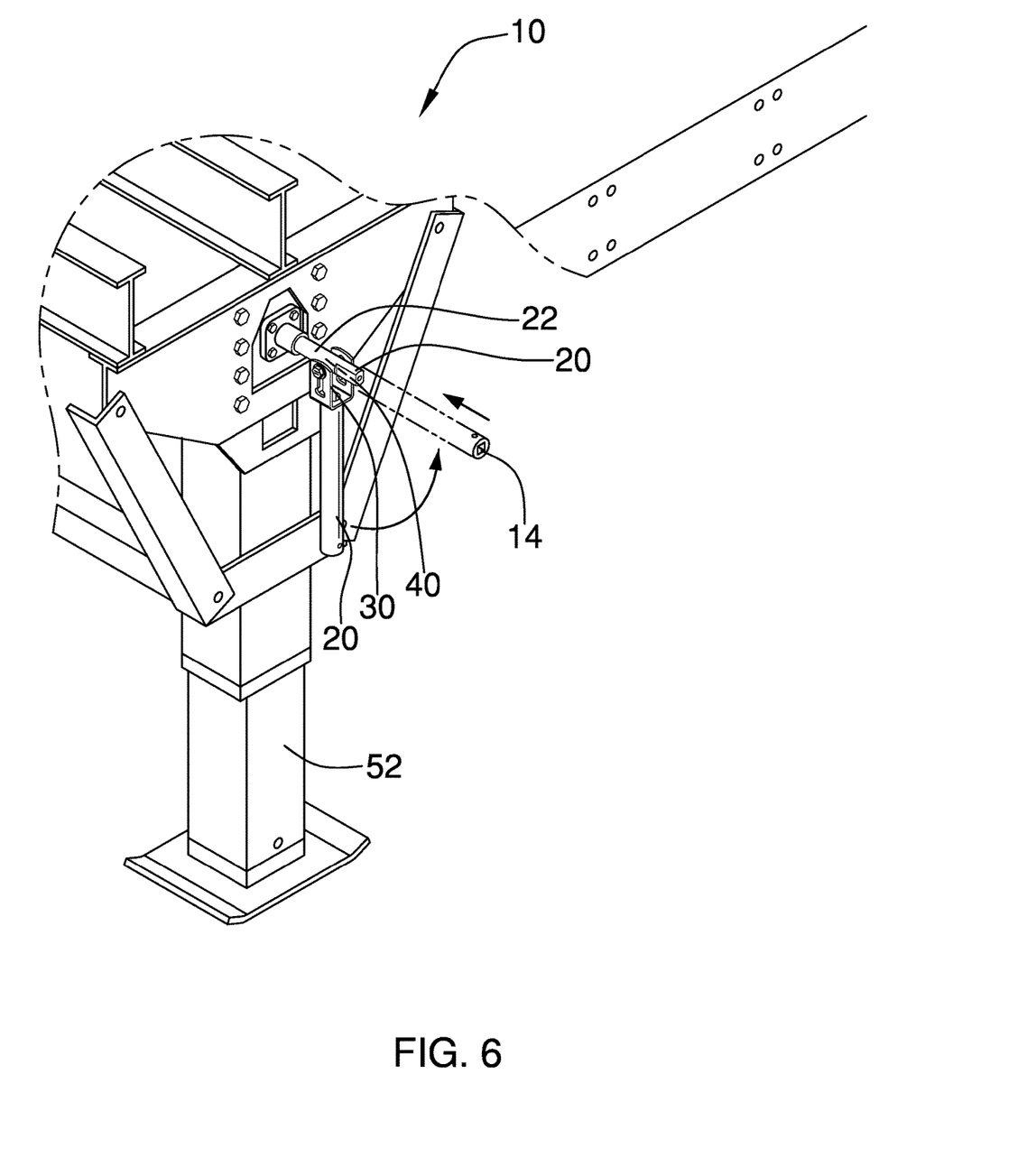
FIG. 6 is an in-use view of an embodiment of the disclosure.

As best illustrated in FIGS. 1 through 9, the trailer landing gear drive shaft rotating device 10 generally comprises a first coupler 12 and a second coupler 14, which are attached to a first end 16 and a second end 18 of a rod 20, respectively. The rod 20 may be cylindrical, as is shown in FIG. 2, although rods 20 that are linear but alternatively shaped also are anticipated. The first coupler 12 is configured to selectively couple to a drive shaft 22 of a trailer landing gear assembly 24 so that the rod 20 is reversibly pivotal between a stowed configuration and an interim configuration, as are shown in FIG. 6, wherein the rod 20 in the stowed configuration is has solid lines and the rod 20 in the interim configuration has dashed lines.

Figure 7:
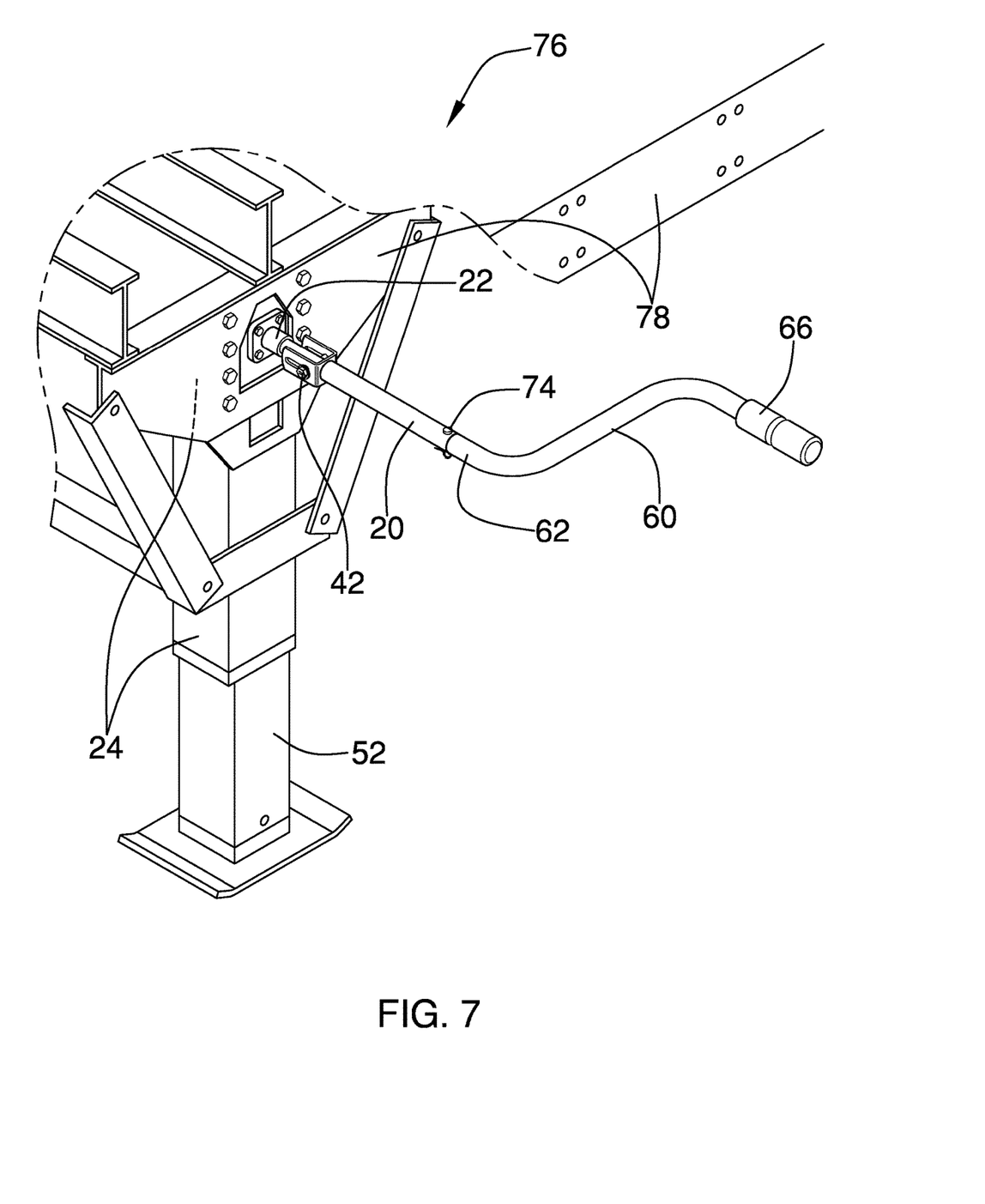
FIG. 7 is an in-use view of an embodiment of the disclosure.
Figure 8:
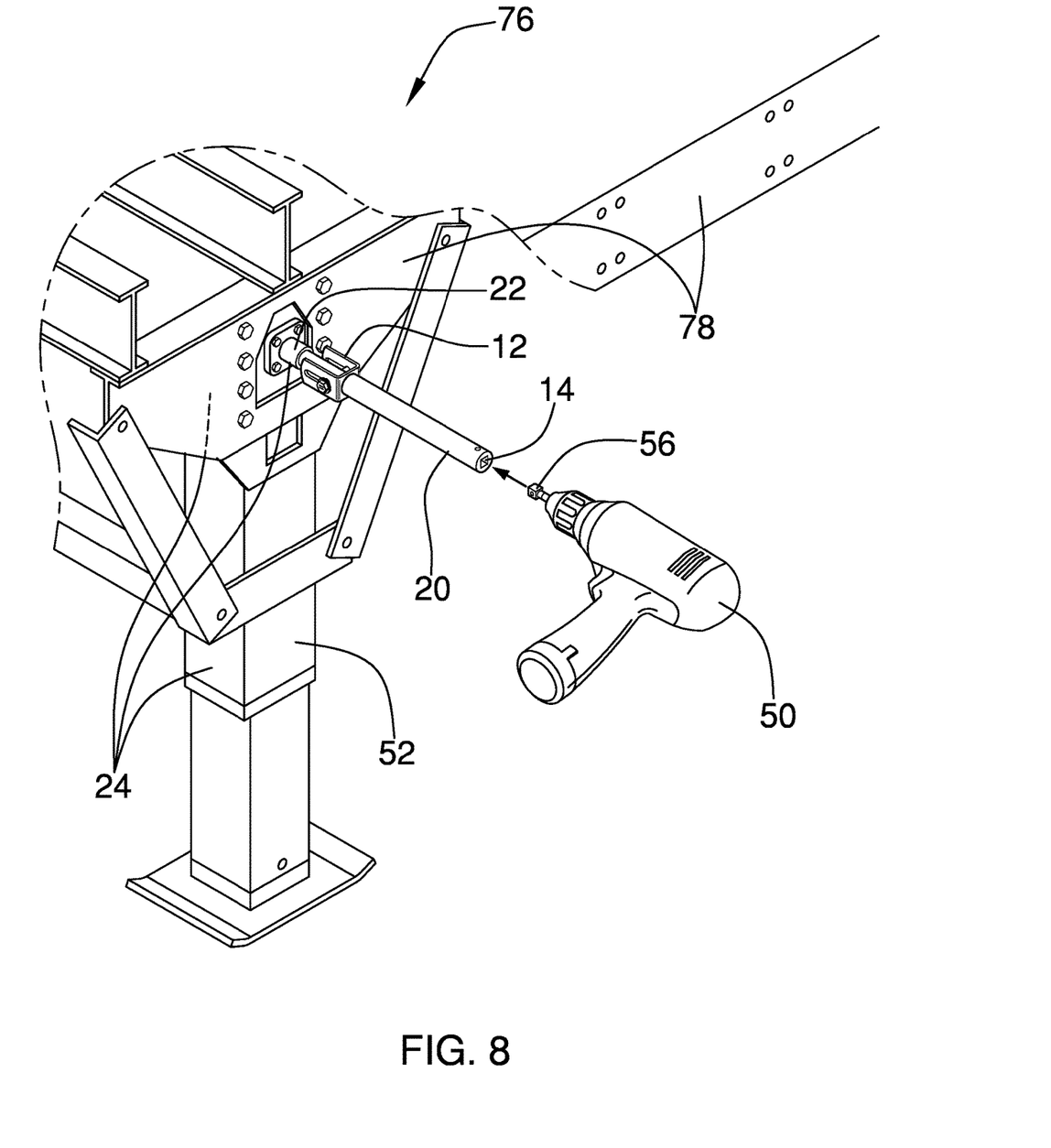
FIG. 8 is an in-use view of an embodiment of the disclosure.

In the stowed configuration, the rod 20 hangs from the drive shaft 22, whereas in the interim configuration the rod 20 is substantially colinear with and slidable relative to the drive shaft 22. A first recess 26 extends into the first end 16 of the rod 20 and is configured for selective insertion of a terminal segment 28 of the drive shaft 22 so that the rod 20 is selectively slidable from the interim configuration to an operable configuration, as is shown in FIGS. 7 and 8, wherein the terminal segment 28 of the drive shaft 22 has been inserted into the first recess 26.

The first coupler 12 may comprise a pair of arms 30, which is attached to and which extends from the first end 16 of the rod 20. The pair of arms 30 defines a gap 32, which is configured for selective insertion of the drive shaft 22. Each keyhole slot 34 of a pair of keyhole slots 34 is positioned in a respective arm 30 so that a hole end 36 and a slot end 38 of the keyhole slot 34 are positioned proximate and distal to the first end 16 of the rod 20, respectively. The keyhole slots 34 are configured for selective alignment with a coupling channel 40 that extends through the drive shaft 22. The coupling channel 40 would have been vacated upon removal of a manual crank that was an original part of the trailer landing gear assembly 24.

A fastener 42 is selectively insertable through the keyhole slots 34 and the coupling channel 40 to attach the rod 20 to the drive shaft 22. The rod 20 then is reversibly pivotal between the stowed and interim configurations. While not shown in the figures, the present invention also anticipates the second end 18 of the rod 20 being attachable to the trailer landing gear assembly 24 by means of a clip, strap, or the like, to secure it in the stowed configuration. The fastener 42 slides within the keyhole slots 34 concurrently with the terminal segment 28 of the rod 20 being inserted into the first recess 26 upon sliding of the rod 20 from the interim configuration to the operable configuration. The terminal segment 28 of the drive shaft 22 being inserted into the first recess 26 positions the rod 20 in substantial linearity with the drive shaft 22, thereby facilitating smooth corotation of the drive shaft 22 and the rod 20.

The fastener 42 may comprise a bolt 44, a nut 46, and a pair of washers 48, as is shown in FIG. 2, or other fastening articles, such as, but not limited to, quick release pins, pivot shafts, and the like. The present invention anticipates other fastening means for pivotally and slidably attaching the rod 20 to the drive shaft 22, such as, but not limited to, a pivot shaft that extends between the arms 30 distal from the rod 20, with the pivot shaft being slidable within a slot that is positioned in the drive shaft 22.

The second coupler 14 is configured to selectively couple to a rotary tool 50. The rod 20 is configured to transfer a rotary force from the rotary tool 50 to the drive shaft 22 to selectively raise and lower one or more legs 52 of the trailer landing gear assembly 24. The present invention is anticipated to be useful for truckers who are required to raise and lower legs 52 of trailer landing gear assemblies 24 on a routine basis, often in inclement weather. The trailer landing gear drive shaft rotating device 10 allows this task to be performed quickly with minimal effort on the part of a trucker. The trailer landing gear drive shaft rotating device 10 also could be used with jacks for campers, trailers, and the like. The rotary tool 50 could be powered by a battery, a power cord, or a compressor of a tractor truck attached to or proximate to a trailer 78 comprising the trailer landing gear assembly 24.

The second coupler 14 may comprise a second recess 54, which is sized and shaped complementarily to a drive bit 56 that is attached to the rotary tool 50. The second recess 54 has a cross-sectional profile 58, which, as is shown in FIG. 2, is substantially square. The present invention anticipates the second recess 54 having cross-sectional profiles 58 of other shapes that are complementary to commonly used drive bits 56, such as, but not limited to slotted, hexagonal, torx, and the like. The second recess 54 is configured for selective insertion of the drive bit 56 to operationally engage the rod 20 to the rotary tool 50. The present invention anticipates the second coupler 14 comprising other coupling means, such as, but not limited to, driver bits that are configured for insertion into sockets attached to rotary tools 50, or the like.

The trailer landing gear drive shaft rotating device 10 also includes a crank arm 60, which is selectively couplable to the second coupler 14 so that the crank arm 60 is operationally attached to the second end 18 of the rod 20. The crank arm 60 is configured to be grasped in one or both hands of a user, positioning the user to rotate the crank arm 60 to apply a rotary force to the rod 20, which is transferred to the drive shaft 22, to selectively raise and lower the one or more legs 52 of the trailer landing gear assembly 24.

As is shown in FIG. 4, the crank arm 60 is doubly curved to that a section 62 of the crank arm 60 extending from its first terminus 64 is offset from a handle section 66 of the crank arm 60, thereby providing leverage in turning the rod 20 and the drive shaft 22. The crank arm 60 is anticipated to be useful in the event of failure of the rotary tool 50, an inability to power the rotary tool 50, such as when batteries are depleted, and similar situations.

Figure 3:
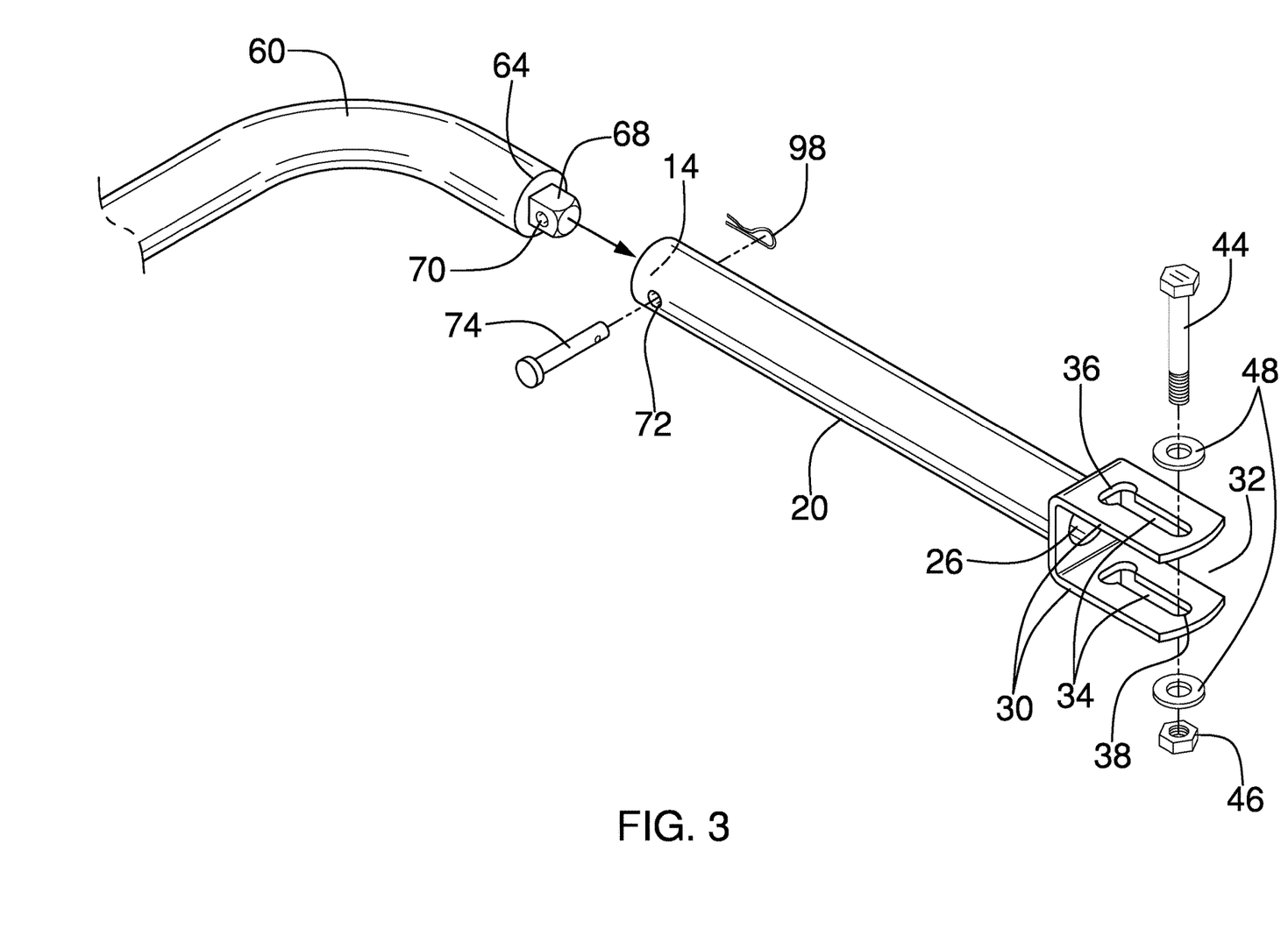
FIG. 3 is an exploded view of an embodiment of the disclosure.

A driving bit 68, which is complementary to the second recess 54, is attached to the first terminus 64 of the crank arm 60. The second recess 54 is positioned for selective insertion of the driving bit 68 to operationally engage the crank arm 60 to the rod 20. As is shown in FIGS. 3-5, a first channel 70 is positioned through the driving bit 68 and a second channel 72 extends through the rod 20 and opens into the second recess 54. The second channel 72 is substantially aligned with the first channel 70 upon insertion of the driving bit 68 into the second recess 54. A coupling pin 74 is selectively insertable through the first channel 70 and the second channel 72 to removably attach the crank arm 60 to the rod 20. The coupling pin 74 may be removably secured in place by a cotter pin 98, which still allows for rapid attachment and removal of the crank arm 60.

The present invention anticipates a landing gear drive shaft rotating system 76 comprising a trailer 78 that it fitted with a trailer landing gear assembly 24, which includes a drive shaft 22 and one or more legs 52. The landing gear drive shaft rotating system 76 also comprises a trailer landing gear drive shaft rotating device 10, according to the specification above, which has been attached to the drive shaft 22 by a first coupler 12 of the landing gear drive shaft rotating device 10. The landing gear drive shaft rotating system 76 also comprises rotary tool 50, which has been attached by a second coupler 14 of the landing gear drive shaft rotating device 10 to a rod 20 of the trailer landing gear drive shaft rotating device 10, as is shown in FIG. 8. The rod 20 is positioned to transfer a rotary force from the rotary tool 50 to the drive shaft 22 to selectively raise and lower the one or more legs 52 of the trailer landing gear assembly 24.

The trailer landing gear drive shaft rotating system 76 also may comprise a crank arm 60, which is attached to the second coupler 14 in place of the rotary tool 50 so that the crank arm 60 is operationally attached to the rod 20, as is shown in FIG. 7. The crank arm 60 is configured to be grasped in one or both hands of a user, positioning the user to rotate the crank arm 60 to apply a rotary force to the rod 20. The rotary force is transferred by the rod 20 to the drive shaft 22 to selectively raise and lower the one or more legs 52 of the trailer landing gear assembly 24.

Figure 9:
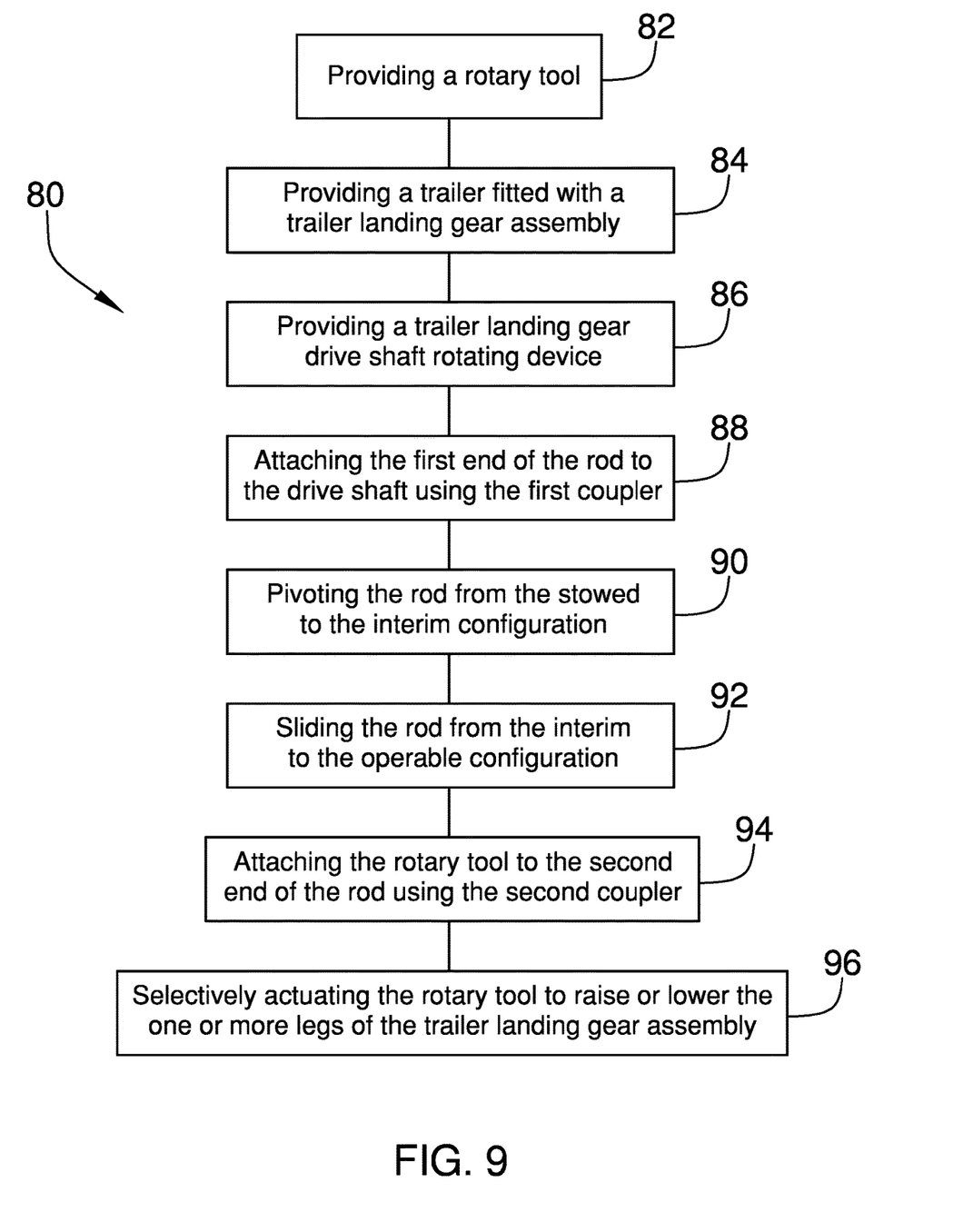
FIG. 9 is a flow diagram for a method utilizing an embodiment of the disclosure.

In use, the trailer landing gear drive shaft rotating device 10 enables a method of operating legs of a trailer landing gear assembly 80. The method 80 comprises a first provision step 82, which entails providing a rotary tool 50. A second provision step 84 of the method 80 is providing a trailer fitted with a trailer landing gear assembly 24 that comprises a drive shaft 22 and one or more legs 52. A third provision step 86 of the method 80 is providing a trailer landing gear drive shaft rotating device 10, according to the specification above. An installation step 88 of the method 80 is attaching the first end 16 of the rod 20 to the drive shaft 22 using the first coupler 12.

A first operational step 90 of the method 80 is pivoting the rod 20 from the stowed configuration to the interim configuration. A second operational step 92 of the method 80 is sliding the rod 20 from the interim configuration to the operable configuration. A third operational step 94 of the method 80 is attaching the rotary tool 50 to the second end 18 of the rod 20 using the second coupler 14. A fourth operational step 96 of the method 80 is selectively actuating the rotary tool 50 to raise or lower the one or more legs 52 of the trailer landing gear assembly 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A trailer landing gear drive shaft rotating device comprising:
   a rod;
   a first coupler attached to a first end of the rod and being configured for selectively coupling to a drive shaft of a trailer landing gear assembly, such that the rod is reversibly pivotal between a stowed configuration, wherein the rod hangs from the drive shaft, to an interim configuration, wherein the rod is substantially colinear with and slidable relative to the drive shaft;
   a first recess extending into the first end of the rod, wherein the first recess is configured for selective insertion of a terminal segment of the drive shaft, such that the rod is selectively slidable from the interim configuration to an operable configuration, wherein the terminal segment of the drive shaft has been inserted into the first recess; and
   a second coupler attached to a second end of the rod and being configured for selectively coupling to a rotary tool, wherein the rod is configured for transferring a rotary force from the rotary tool to the drive shaft for selectively raising and lowering one or more legs of the trailer landing gear assembly.

2. The trailer landing gear drive shaft rotating device of claim 1, wherein the first coupler comprises:
   a pair of arms attached to and extending from the first end of the rod, such that the pair of arms define a gap, where the gap is configured for selective insertion of the drive shaft;
   a pair of keyhole slots, each keyhole slot being positioned in a respective arm, such that a hole end and a slot end of the keyhole slot are positioned proximate and distal to the first end of the rod, respectively, wherein the keyhole slots are configured for selective alignment with a coupling channel extending through a drive shaft; and
   a fastener selectively insertable through the keyhole slots and the coupling channel for attaching the rod to the drive shaft.

3. The trailer landing gear drive shaft rotating device of claim 2, wherein the fastener comprises a bolt, a nut, and a pair of washers.

4. The trailer landing gear drive shaft rotating device of claim 1, wherein the second coupler comprises a second recess, the second recess being sized and shaped complementarily to a drive bit attached to the rotary tool, wherein the second recess is configured for selective insertion of the drive bit for operationally engaging the rod to the rotary tool.

5. The trailer landing gear drive shaft rotating device of claim 4, wherein the second recess has a cross-sectional profile, the cross-sectional profile being substantially square.

6. The trailer landing gear drive shaft rotating device of claim 1, further including a crank arm selectively couplable to the second coupler, such that the crank arm is operationally attached to the second end of the rod, wherein the crank arm is configured for grasping in one or both hands of a user, positioning the user for rotating the crank arm for applying a rotary force to the rod, which is transferred to the drive shaft, for selectively raising and lowering the one or more legs of the trailer landing gear assembly.

7. The trailer landing gear drive shaft rotating device of claim 6, further including a driving bit attached to a first terminus of the crank arm, the driving bit being complementary to the second recess, such that the second recess is positioned for selective insertion of the driving bit for operationally engaging the crank arm to the rod.

8. The trailer landing gear drive shaft rotating device of claim 7, further including:
a first channel positioned through the driving bit;
a second channel extending through the rod and opening into the second recess, such that the second channel is substantially aligned with the first channel upon insertion of the driving bit into the second recess; and
a coupling pin selectively insertable through the first channel and the second channel for removably attaching the crank arm to the rod.

9. A trailer landing gear drive shaft rotating system comprising:
a trailer fitted with a trailer landing gear assembly comprising a drive shaft and one or more legs;
a rod attached to a first end of the rod to the drive shaft by a first coupler, such that the rod is reversibly pivotal between a stowed configuration, wherein the rod hangs from the drive shaft, to an interim configuration, wherein the rod is substantially colinear with and slidable relative to the drive shaft;
a first recess extending into the first end of the rod, wherein the first recess is configured for selective insertion of a terminal segment of the drive shaft, such that the rod is selectively slidable from the interim configuration to an operable configuration, wherein the terminal segment of the drive shaft has been inserted into the first recess;
a second coupler attached to a second end of the rod; and
a rotary tool attached to the second coupler, such that the rod is positioned for transferring a rotary force from the rotary tool to the drive shaft for selectively raising and lowering the one or more legs of the trailer landing gear assembly.

10. The trailer landing gear drive shaft rotating system of claim 9, wherein the first coupler comprises:
a pair of arms attached to and extending from the first end of the rod, such that the pair of arms define a gap, the drive shaft being positioned in the gap;
a pair of keyhole slots, each keyhole slot being positioned in a respective arm, such that a hole end and a slot end of the keyhole slot are positioned proximate and distal to the first end of the rod, respectively, the keyhole slots are being in alignment with a coupling channel extending through a drive shaft; and
a fastener inserted through the keyhole slots and the coupling channel, such that the rod is attached to the drive shaft.

11. The trailer landing gear drive shaft rotating system of claim 10, wherein the fastener comprises a bolt, a nut, and a pair of washers.

12. The trailer landing gear drive shaft rotating system of claim 9, wherein the second coupler comprises a second recess, the second recess being sized and shaped complementarily to a drive bit attached to the rotary tool, the drive bit being inserted into the second recess such that the rod is operationally engaged to the rotary tool.

13. The trailer landing gear drive shaft rotating system of claim 12, wherein the second recess has a cross-sectional profile, the cross-sectional profile being substantially square.

14. The trailer landing gear drive shaft rotating system of claim 9, further including a crank arm attached to the second coupler in place of the rotary tool, such that the crank arm is operationally attached to the second end of the rod, wherein the crank arm is configured for grasping in one or both hands of a user, positioning the user for rotating the crank arm for applying a rotary force to the rod, which is transferred to the drive shaft, for selectively raising and lowering the one or more legs of the trailer landing gear assembly.

15. The trailer landing gear drive shaft rotating system of claim 14, further including a driving bit attached to a first terminus of the crank arm, the driving bit being complementary to and inserted into the second recess, such that the crank arm is operationally engaged to the rod.

16. The trailer landing gear drive shaft rotating system of claim 15, further including:
a first channel positioned through the driving bit;
a second channel extending through the rod and opening into the second recess, such that the second channel is substantially aligned with the first channel; and
a coupling pin inserted through the first channel and the second channel, such that the crank arm is attached to the rod.

17. A method of operating legs of a trailer landing gear assembly comprising the steps of:
providing a rotary tool;
providing a trailer fitted with a trailer landing gear assembly comprising a drive shaft and one or more legs;
providing a trailer landing gear drive shaft rotating device comprising:
a rod,
a first coupler attached to a first end of the rod and being configured for selectively coupling to a drive shaft of a trailer landing gear assembly, such that the rod is reversibly pivotal between a stowed configuration, wherein the rod hangs from the drive shaft, to an interim configuration, wherein the rod is substantially colinear with and slidable relative to the drive shaft,
a first recess extending into the first end of the rod, wherein the first recess is configured for selective insertion of a terminal segment of the drive shaft, such that the rod is selectively slidable from the interim configuration to an operable configuration, wherein the terminal segment of the drive shaft has been inserted into the first recess, and
a second coupler attached to a second end of the rod and being configured for selectively coupling to a rotary tool, wherein the rod is configured for transferring a rotary force from the rotary tool to the drive shaft for selectively raising and lowering one or more legs of the trailer landing gear assembly;
attaching the first end of the rod to the drive shaft using the first coupler;

pivoting the rod from the stowed configuration to the interim configuration;
sliding the rod from the interim configuration to the operable configuration;
attaching the rotary tool to the second end of the rod using the second coupler; and
selectively actuating the rotary tool to raise or lower the one or more legs of the trailer landing gear assembly.

\* \* \* \* \*